United States Patent
Davis, Jr. et al.

[19]
[11] Patent Number: 6,139,082
[45] Date of Patent: Oct. 31, 2000

[54] CROSS CAR BEAM WITH ADJUSTABLE MOUNTING LOCATIONS

[75] Inventors: Joseph J. Davis, Jr., Ortonville; Timothy F. O'Brien, White Lake, both of Mich.

[73] Assignee: Lear Automotive Dearborn, Inc., Southfield, Mich.

[21] Appl. No.: 09/208,547

[22] Filed: Dec. 9, 1998

[51] Int. Cl.[7] .................................................. B62D 25/14
[52] U.S. Cl. ..................... 296/72; 296/188; 296/203.02; 280/752
[58] Field of Search .............................. 296/72, 70, 188, 296/203.02; 280/752

[56] References Cited

U.S. PATENT DOCUMENTS

| | | | |
|---|---|---|---|
| 5,341,895 | 8/1994 | Grinberg et al. | 296/72 X |
| 5,358,300 | 10/1994 | Gray | 296/72 X |
| 5,387,023 | 2/1995 | Deneau | 296/72 |
| 5,564,769 | 10/1996 | Deneau et al. | 296/72 |
| 5,678,877 | 10/1997 | Nishijima et al. | 296/72 X |
| 5,752,718 | 5/1998 | Shnabel et al. | 296/72 X |
| 5,806,916 | 9/1998 | Sinner et al. | 296/72 X |
| 5,823,602 | 10/1998 | Kelman et al. | 296/70 |
| 5,868,426 | 2/1999 | Edwards et al. | 296/70 X |
| 5,927,755 | 7/1999 | Matsuo et al. | 296/70 X |
| 5,931,520 | 8/1999 | Seksaria et al. | 296/72 X |
| 5,934,733 | 8/1999 | Manwaring | 296/72 |
| 5,934,744 | 8/1999 | Jergens et al. | 296/72 X |

*Primary Examiner*—Joseph D. Pape
*Attorney, Agent, or Firm*—MacMillan, Sobanski & Todd, LLC

[57] ABSTRACT

An improved cross car beam is tailored to be utilized in either right hand or left hand drive applications. The cross car beam has channels which extend for elongate distances such that components mounted to the cross car beam can be mounted in the channels at an infinite number of locations. This allows the use of a single cross car beam for both right hand and left hand drive applications.

7 Claims, 1 Drawing Sheet

CROSS CAR BEAM WITH ADJUSTABLE MOUNTING LOCATIONS

BACKGROUND OF THE INVENTION

This invention relates to a cross car beam having adjustable location mounting structure for attaching various automotive components.

In the prior art, cross car beams are utilized in vehicles having a so-called "cab forward" design to provide additional rigidity against lateral impacts. Typically, a cross car beam is formed of metal, such as aluminum, and extends between the door pillars in the forward end of the cab of a vehicle. The cross car beam provides rigidity against the cab crushing upon a lateral impact.

Many accessories are attached to the cross car beam in the prior art. Energy absorption members are welded to the cross car beam, and within the instrument panel of the vehicle. Energy absorption members are placed adjacent the area where occupant's knees are likely to be driven in the event of a collision. The energy absorption members serve to slow and protect the occupant's legs in the event of such a collision. In the prior art, these energy absorption members have been attached to dedicated locations on the cross car beam. Typically, the location where the driver's legs are likely to be, differs from that of the passenger. In a typical vehicle design, the center line of the vehicle cab does not form a symmetric break between the locations for the driver and the passenger. More typically, the passenger is given a somewhat greater portion of the space. Thus, the location for the energy absorption members is not symmetric about the center line.

For that reason, in the prior art having dedicated locations for the energy absorption members, there have been necessarily distinct cross car beams for right hand and left hand drive applications. This increases the number of parts which are necessary.

The cross car beam is also often utilized to mount other features such as the instrument panel cluster, or passenger airbag module. Again, these features have typically been mounted at dedicated mount locations. The prior art has thus necessarily required distinct cross car beams for both left and right hand applications, as well as for different vehicle cab designs.

SUMMARY OF THE INVENTION

In a disclosed embodiment of this invention, a cross car beam has an adjustable mount location for various accessories. This provides a universal beam. In one embodiment, the cross car beam is extruded from aluminum, and has channels which extend generally along the entire length of the cross car beam. The channels serve as mount locations for the various components. Components such as the energy absorption members can be mounted at any location along a respective channel. In this way, a single cross car beam can be utilized for both right and left hand driver applications.

Similarly, a second channel may be provided for mounting additional components such as the instrument panel cluster, or the passenger airbag module. Again, by utilizing a channel which extends along the length of the cross car beam, one can mount these components at any location.

These and other features of the present invention can be best understood from the following specification and drawings, the following of which is a brief description.

DETAILED DESCRIPTION OF A PREFERRED EMBODIMENT

Figure 1:
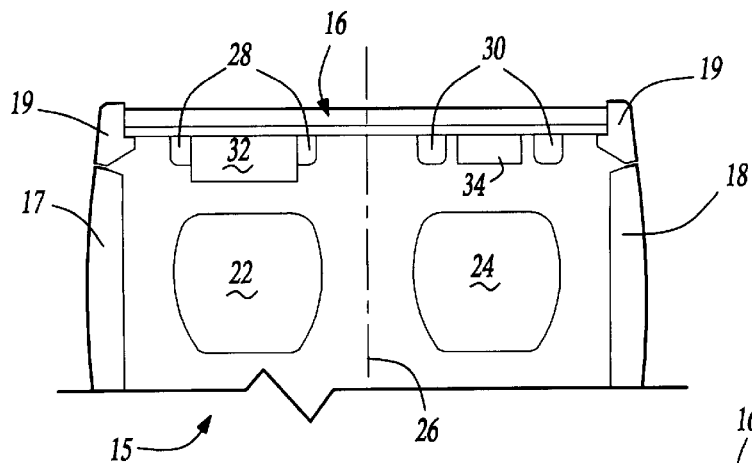
FIG. 1 is a schematic view of the vehicle cab incorporating the present invention.

Vehicle cab 15 is illustrated in FIG. 1, and incorporates the inventive cross car beam 16, shown somewhat schematically in this figure. The cross car beam 16 extends between the vehicle doors 17 and 18. The cross car beam 16 is fixed to the vehicle door pillars 19, such as by welding. The inventive cross car beam is preferably extruded from aluminum and provides additional rigidity against a lateral collision.

The driver seat 22 in a left hand drive application is illustrated in FIG. 1. The passenger seat 24 is spaced on an opposed side of a center line 26 of the cab 15. However, as is typical in vehicle design, more space is provided to the passenger 24 than to the driver 22. Thus, the location of various components within the vehicle 10 is not symmetric about the center line 26.

As shown, energy absorption members 28 are positioned adjacent to the location where the driver's legs are likely to be. Similarly, energy absorption members 30 are positioned at the location where the passenger's legs are likely to be. These locations are not symmetric about the center line 26. Due to this, in the prior art, a supplier had to provide separate cross car beams for right hand and left hand drive applications. Further, the cross car beam needed to be manufactured for each specific vehicle cab.

Similarly, the cross car beam 16 in this invention mounts the vehicle instrument panel cluster 32, and a passenger airbag module 34. Again, these components have typically been mounted to the cross car beam in the prior art, although at dedicated locations.

Figure 2:
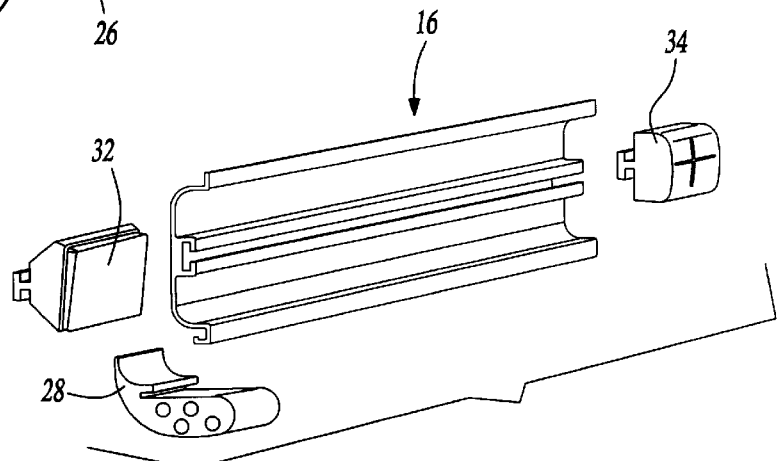
FIG. 2 shows a perspective view of the inventive cross car beam.

As shown in FIG. 2, the cross car beam 16 is provided by a part extending along an axis, that incorporates a lower channel defined by walls 36 and 38. Preferably, the beam is extruded from aluminum. The lower channel 36 and 38 will receive the energy absorption members 28 and 30, as will be explained below. A back wall 40 of the cross car beam 16 further provides a face for supporting the energy absorption member 28. A second channel is defined by walls 42 and 44 leading inwardly into a space 46. Again, the space 46 extends along the length of the cross car beam 16. A neck 48 extends into the space 46 and between the innermost spaced ends of the walls 42 and 44. A further wall 50 extends upwardly to a tip 52.

Figure 3:
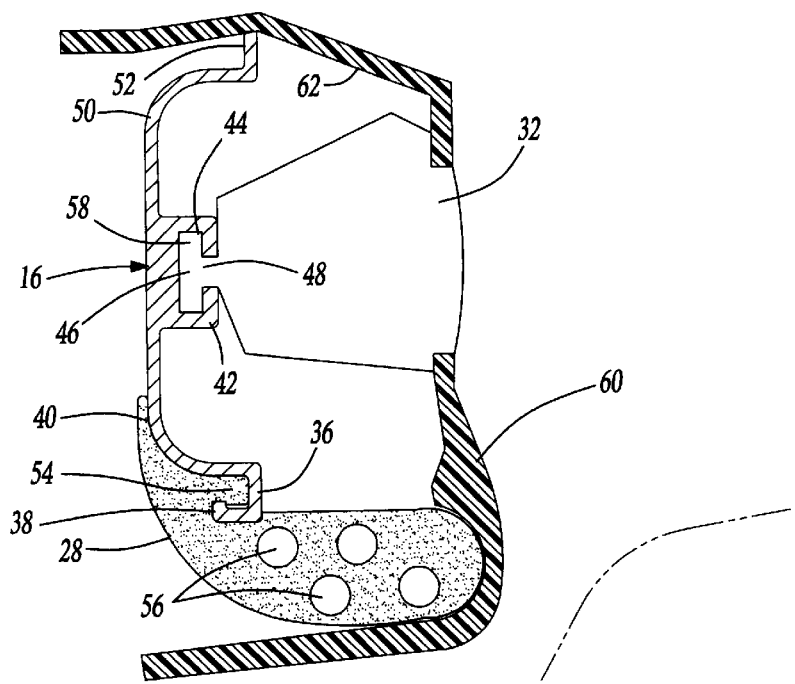
FIG. 3 is a cross sectional view through a cross car beam mounting several components.

As shown in FIG. 3, the energy absorption member 28 includes a clip member 54 which fits into the channel defined by the walls 36 and 38. Openings 56 in member 28 facilitate its use in energy absorption. In this way, the energy absorption member 28 can be adjusted along the length of the cross car beam 16. The energy absorption member 28 may be welded or screwed at any location along the channel. Alternatively, the channel and the energy absorption member can be constructed to be a tight fit such that they are simply held in place in the channel.

Similarly, the instrument panel module 32 is shown having structure 58 fitting into the space 46 and the neck 48. Again, the channel allows the instrument panel to be mounted on either side of the cross car beam 16, and to be adjusted along the length of the channel. The passenger airbag module 34 is mounted in a similar fashion with a similar mounting structure in the channel 46.

The present invention thus allows the use of a single cross car beam for both right hand and left hand applications. Further, the inventive cross car beam facilitates the use of a single cross car beam while still providing the adjustability availability for the structure. The instrument panel 60 is shown schematically in FIG. 3 defined in front of the module 32, and surrounding the energy absorption member 28. The wall 52 serves as a stop against an interface 62 of the instrument panel 60.

Although the channels are shown extending the entire length of the beam 16, it should be understood that the channels need only extend along a portion of the beam associated with the two ends. It is preferred the channels extend along the entire length to facilitate the manufacture. However, at a minimum, the channel need only extend for a significantly great distance such that the position of the absorption members is infinitely adjustable along a portion of a channel associated with each of the two ends of the beam.

A preferred embodiment of this invention has been disclosed, however, a worker of ordinary skill in this art would recognize that certain modifications come within the scope of this invention. For this reason, the following claims should be studied to determine the true scope and content of this invention.

What is claimed is:

1. An assembly for being mounted within a vehicle, comprising:

a cross beam having a front surface and a rear surface, the cross beam including a first channel defined by a pair of walls extending outwardly from the rear surface of the cross beam, and a second channel defined by a pair of walls extending outwardly from the front surface of the cross beam, the second channel being oriented in an opposite direction with respect to the first channel;

at least one energy absorbing member including a clip member extending therefrom, the clip member being received within the first channel to mount the at least one energy absorbing member to the cross beam; and at least one component including a structure extending therefrom, the structure being received within the second channel to mount the at least one component to the cross beam, wherein the first and second channels extend along a length of the cross beam such that the at least one energy absorbing member and the at least one component can be mounted at any one of an infinite number of locations along the length of the cross beam.

2. The assembly according to claim 1, wherein the at least one energy absorbing member further includes at least one opening for adjusting the absorption of energy along a length of the at least one energy absorbing member.

3. The assembly according to claim 1, wherein a portion of the rear surface forms a supporting face when the at least one energy absorbing member is mounted to the cross beam.

4. The assembly according to claim 1, wherein a tip at the end of the cross beam acts as a stop for an interface of the at least one component.

5. The assembly according to claim 1, wherein the at least one component comprises an instrument panel.

6. The assembly according to claim 1, wherein the at least one component comprises an airbag.

7. The assembly according to claim 1, wherein the at least one component comprises one of an instrument panel and an airbag.

* * * * *